H. L. MANSFIELD & B. ROGERS.
PHOTO PRINTING APPARATUS.
APPLICATION FILED MAY 11, 1912.
1,049,504.
Patented Jan. 7, 1913.
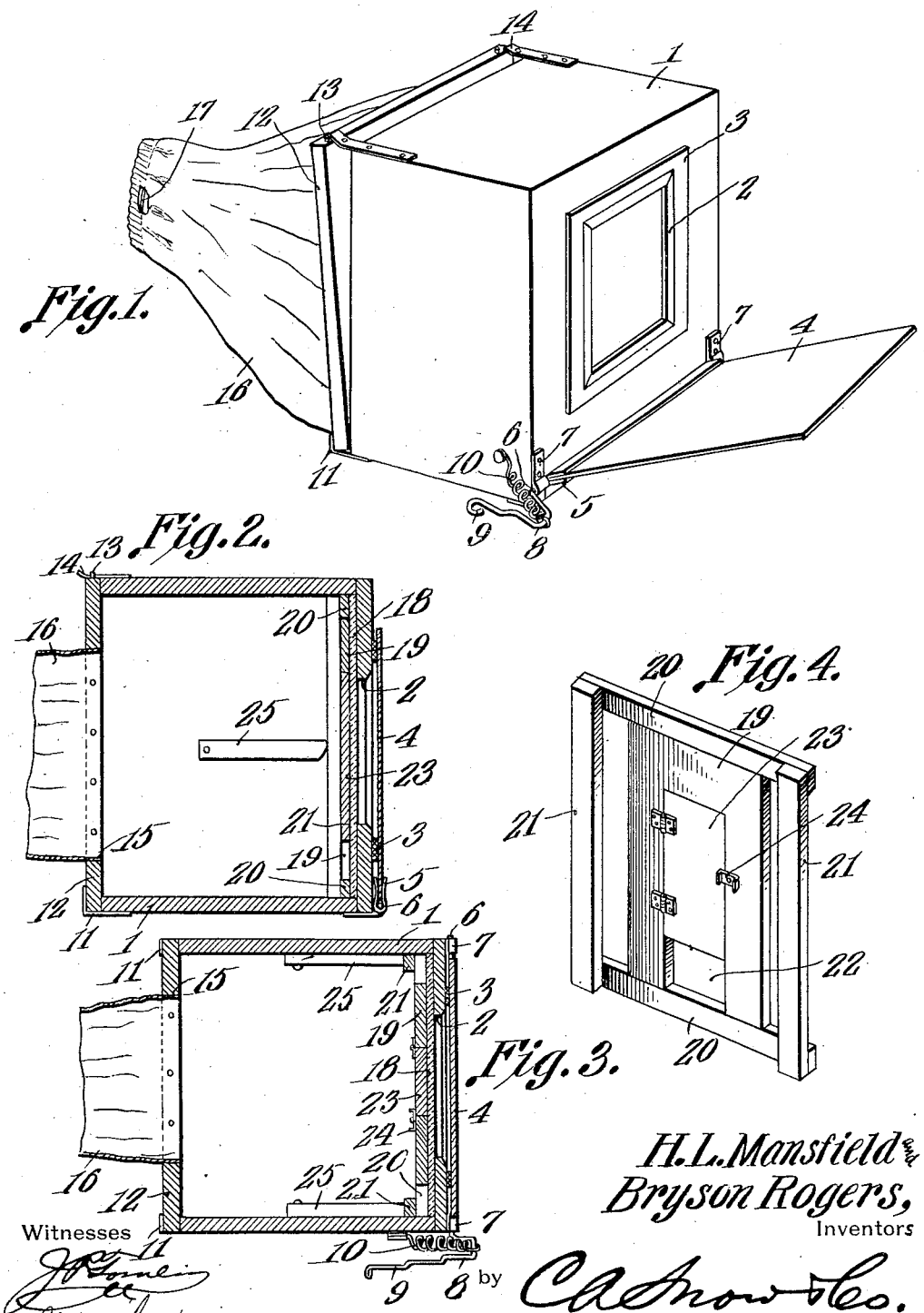
H. L. Mansfield &
Bryson Rogers,
Inventors

UNITED STATES PATENT OFFICE.

HARRY L. MANSFIELD AND BRYSON ROGERS, OF LUCAS, KANSAS.

PHOTO PRINTING APPARATUS.

1,049,504. Specification of Letters Patent. Patented Jan. 7, 1913.

Application filed May 11, 1912. Serial No. 696,772.

*To all whom it may concern:*

Be it known that we, HARRY L. MANSFIELD and BRYSON ROGERS, citizens of the United States, residing at Lucas, in the county of Russell, State of Kansas, have invented a new and useful Photo Printing Apparatus, of which the following is a specification.

This invention relates to apparatus for printing photographs, its object being to provide a simple and efficient mechanism whereby prints can be made quickly and without danger of exposing them to the action of actinic rays.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, the preferred form of the invention has been shown.

In said drawings:—Figure 1 is a perspective view of the apparatus, the shutter being shown partly closed and the back board being partly opened. Fig. 2 is a central vertical section through the apparatus, the free end portion of the flexible hood being removed. Fig. 3 is a central horizontal section through the apparatus. Fig. 4 is a perspective view of the removable negative holding structure.

Referring to the figures by characters of reference 1 designates a box-like casing the front of which is provided with an opening 2 surrounded by a strip of soft material such as indicated at 3. This material is adapted to be contacted by a flat plate 4 constituting a shutter, said plate being held within a clip 5 which extends longitudinally of and rotates with a rod 6 journaled in brackets 7 on the front of the casing 1. A crank arm 8 extends from one end of the rod and merges into a handle 9. A spring 10 is secured to the crank arm and to one side of the casing 1 and serves to hold the shutter either pressed tightly against the soft material 3 surrounding the opening 2 or else shifted downwardly away from the casing so as not to interfere with the admission of light to the opening 2.

L-shaped brackets 11 are secured to the bottom of the casing 1 and extend beyond the back or open end of the casing. These brackets are adapted to support a back plate 12 having lugs 13 upstanding therefrom and which are shiftable into engagement with spring clips 14 extending rearwardly from the top of the casing. When lugs 13 are in engagement with the clips, the back board 12 is held tightly against the back of the casing 1. This back board has an opening 15 therein and secured to said opening is a flexible tube 16 of a material which will exclude light, this tube having its free end normally contracted by means of an elastic band 17 housed therein. The tube is of sufficient size to receive an arm of the operator and, when the arm is in position therein, the elastic band 17 will bind the free end of the tube tightly about the arm so as thus to exclude light from the interior of the tube.

A glass plate 18 is adapted to be seated in one end of the casing 1 so as to extend across the opening 2 and detachably mounted in the casing and back of the glass plate 18 is a backing structure consisting of a block 19 having top and bottom strips 20 secured thereto and connected by side strips 21. An opening 22 is formed within the block 19 and is adapted to be closed by a door 23 which is hinged to the block and is provided with any suitable means, such as a button 24 whereby the door will be held closed within the opening 22. Retaining strips 25 are pivotally mounted upon the inner faces of the sides of the casing and are adapted, when swung downwardly, to contact with the side strips 21 and thus force the block 19 against the plate 18 or against a negative which may be placed upon the back face of said plate.

In using the apparatus the holding devices 25 are shifted upwardly and the backing shown in Fig. 4 is removed. The negative is then placed against the transparent plate 18 after which the backing is reinserted into the casing and clamped upon the negative by means of the holding devices 25. An ample supply of sensitized paper is then placed in the casing 1 after which the back board 12 is fastened in place. One arm of the operator is then inserted into the tube 16 and the shutter 4 is shifted so as to close the opening 2. Door 23 is then opened by the operator, one of the sheets of sensitized paper is placed within the opening 22 and the door 23 is then resecured in closed position so as to clamp the sensitized material upon the negative. After the parts have thus been adjusted, the shutter 4 is opened by pulling upwardly on handle 9. After the sensitized material has been exposed a sufficient length of time, the handle 9 is pushed downwardly and the shutter 4 will thus swing to closed position. Door 23 is then opened, the exposed paper removed from opening 22, another piece of sensitized paper placed within the opening, and the foregoing operation then repeated. After a sufficient number of prints have been made, the apparatus can be removed to a dark room and the exposed sheets developed as ordinarily.

What is claimed is:—

1. Photo-printing apparatus including a casing having an exposure opening in one end, a shutter for closing said opening, a negative backing device removably mounted within the casing and having an opening for the reception of sensitized material, a closure for said opening, and a flexible arm-receiving tube connected to one end of the casing.

2. Photo-printing apparatus including a casing having an exposure opening in one wall, a shutter, yielding means for holding the shutter normally across the opening, a backing removably mounted within the casing for holding a negative across the opening, said backing having an opening to receive sensitized material, a closure movably mounted within the opening in the backing, means for detachably securing the backing against a negative, and a flexible arm-receiving tube detachably connected to one wall of the casing.

3. Photo-printing apparatus including a casing having an exposure opening in one wall, a transparent plate extending across said opening, a shutter for closing the opening, yielding means for holding the shutter in closed position, a backing detachably mounted within the casing for holding a negative against the transparent plate, said backing having an opening for the reception of sensitized material, a closure for the opening in the backing, means for fastening said closure within the opening, means for detachably securing the backing in active position within the casing, and a flexible arm-receiving tube connected to one wall of the casing.

4. Photo-printing apparatus including a casing having an exposure opening in one wall, a transparent plate extending across the opening, a clip mounted for rotation upon said wall, a shutter extending from the clip, elastic means for holding the shutter either in or out of active position across the exposure opening, a handle for actuating the structure, and means within the casing for holding a negative and a sensitized material back of the exposure opening.

In testimony that we claim the foregoing as our own, we have hereto affixed our signatures in the presence of two witnesses.

HARRY L. MANSFIELD.
BRYSON ROGERS.

Witnesses:
 FRANK A. VOPAT,
 W. T. DICK.

---

Copies of this patent may be obtained for five cents each, by addressing the "Commissioner of Patents, Washington, D. C."